US010222987B2

(12) United States Patent
Brosch

(10) Patent No.: US 10,222,987 B2
(45) Date of Patent: Mar. 5, 2019

(54) DATA DEDUPLICATION WITH AUGMENTED CUCKOO FILTERS

(71) Applicant: Dell Products L.P., Round Rock, TX (US)

(72) Inventor: Ryan W. Brosch, Arden Hills, MN (US)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 15/041,938

(22) Filed: Feb. 11, 2016

(65) Prior Publication Data

US 2017/0235496 A1    Aug. 17, 2017

(51) Int. Cl.
  *G06F 17/30*    (2006.01)
  *G06F 3/06*    (2006.01)

(52) U.S. Cl.
  CPC .......... *G06F 3/0608* (2013.01); *G06F 3/0641* (2013.01); *G06F 3/0685* (2013.01); *G06F 17/30156* (2013.01); *G06F 17/3033* (2013.01); *G06F 17/30097* (2013.01)

(58) Field of Classification Search
  CPC ............... G06F 3/0608; G06F 3/0641; G06F 17/30097; G06F 17/30159; G06F 17/3033; G06F 17/30156; G06F 17/30489; G06F 2212/1044; G06F 3/0685
  See application file for complete search history.

(56) References Cited

U.S. PATENT DOCUMENTS

| 8,566,373 | B2 * | 10/2013 | Hao ..................... G06F 21/6236 707/802 |
| 8,898,120 | B1 * | 11/2014 | Efstathopoulos ... G06F 17/3007 707/692 |
| 8,935,487 | B2 * | 1/2015 | Sengupta ............ G06F 12/0862 707/692 |
| 9,659,047 | B2 * | 5/2017 | Sharma ............. G06F 17/30327 |
| 9,785,666 | B2 * | 10/2017 | Li ........................ G06F 17/3033 |
| 2008/0065639 | A1 * | 3/2008 | Choudhary ............... G06F 7/02 |
| 2008/0228691 | A1 | 9/2008 | Shavit et al. |

(Continued)

OTHER PUBLICATIONS

Bin Fan, David G. Andersen, Michael Kaminsky and Michael D. Mitzenmacher, "Cuckoo Filter: Practically Better Than Bloom", 2014, ACM, pp. 75-87. (Year: 2014).*

(Continued)

*Primary Examiner* — Merilyn P Nguyen
(74) *Attorney, Agent, or Firm* — Jackson Walker L.L.P.

(57) ABSTRACT

A data deduplication process maintains a data dictionary including a storage tablet and a secondary index containing data indicative of previously received data blocks. The tablet includes hashes of previous data blocks and the index includes one or more cuckoo filters storing fingerprints derived from block hashes of previous data blocks. When a new data block arrives, its block hash and fingerprint are generated. The storage tablet is queried with the block hash and the secondary index is queried with the fingerprint. If the dictionary contains no matching block hash or fingerprint, the new data block is stored in its entirety. If the dictionary contains a matching block hash or fingerprint, the new data block may be a duplicate data block that can be deduplicated by storing a reference to the previous data block instead of storing the new data block in its entirety.

18 Claims, 5 Drawing Sheets

(56) References Cited

U.S. PATENT DOCUMENTS

| | | |
|---|---|---|
| 2009/0193223 A1 | 7/2009 | Saliba et al. |
| 2010/0011028 A1 | 1/2010 | Dade |
| 2010/0042790 A1 | 2/2010 | Mondal et al. |
| 2010/0088296 A1 | 4/2010 | Periyagaram et al. |
| 2010/0250896 A1 | 9/2010 | Matze |
| 2011/0016152 A1 | 1/2011 | Popovski et al. |
| 2011/0055471 A1 | 3/2011 | Thatcher et al. |
| 2011/0066628 A1 | 3/2011 | Jayaraman |
| 2011/0099351 A1 | 4/2011 | Condict |
| 2011/0227790 A1 | 9/2011 | Li et al. |
| 2011/0246741 A1 | 10/2011 | Raymond et al. |
| 2011/0276780 A1 | 11/2011 | Sengupta et al. |
| 2012/0016845 A1 | 1/2012 | Bates |
| 2012/0166401 A1 | 6/2012 | Li et al. |
| 2012/0166448 A1 | 6/2012 | Li et al. |
| 2013/0018854 A1 | 1/2013 | Condict |
| 2013/0018855 A1 | 1/2013 | Eshghi et al. |
| 2013/0036277 A1* | 2/2013 | Szczepkowski ...... G06F 3/0608 711/159 |
| 2013/0238876 A1 | 9/2013 | Fiske et al. |
| 2013/0339319 A1 | 12/2013 | Woodward et al. |
| 2014/0214775 A1 | 7/2014 | Shi et al. |
| 2014/0222770 A1 | 8/2014 | Lad et al. |
| 2014/0281486 A1 | 9/2014 | Nayshtut et al. |
| 2015/0052309 A1 | 2/2015 | Philip et al. |
| 2015/0066871 A1 | 3/2015 | Kulkarni et al. |
| 2015/0269279 A1 | 9/2015 | Bosshart |
| 2015/0370495 A1 | 12/2015 | Georgiev |
| 2015/0370720 A1 | 12/2015 | Rowlands et al. |
| 2016/0162207 A1* | 6/2016 | Sharma ............. G06F 17/30327 711/162 |
| 2016/0179893 A1* | 6/2016 | He .................... G06F 17/30495 707/723 |
| 2017/0187818 A1* | 6/2017 | Haswell ............. H04L 67/2823 |

OTHER PUBLICATIONS

Fan, Bin et al., Cuckoo Filter: Practically Better Than Bloom, CoNEXT '14, Proceedings of the 10th ACM Int'l Conference on Emerging Networking Experiments and Technologies, pp. 75-88 (ACM Dec. 2, 2014).

* cited by examiner

DATA DEDUPLICATION WITH AUGMENTED CUCKOO FILTERS

TECHNICAL FIELD

The present disclosure generally relates to data storage and data storage systems and, in particular, data storage systems employing deduplication.

BACKGROUND

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an IHS may include a variety of hardware and software components that may be configured to process, store, and communicate information and may include one or more computer systems, data storage systems, and networking systems.

An IHS can be configured in several different configurations ranging from a single, stand-alone computer system to a distributed, multi-device computer system, to a networked computer system with remote or cloud storage systems.

IHSs that receive and store significant amounts of data from external sources, generally referred to herein as user data, may include data deduplication features to conserve the amount of storage space required. Data deduplication applications may translate comparatively large amounts of data, referred to herein as data blocks, into comparatively small representations, referred to herein as block hashes or, more simply, hashes. Data deduplication applications may operate on data at its source or at its ultimate destination or target and may process variable or fixed-size data blocks. As an example, a fixed block data deduplication application may translate or "hash" a 4 Kb data block into a 32 bytes (256 bit) block hash.

Block hashes for previously received data blocks may be stored in a data structure referred to herein as a "data dictionary" or, more simply, "dictionary" that maps a block hash to a storage location where the data block is or will be stored. When a data storage device receives a new data block, a data deduplication application may generate a block hash for the data block and use the block hash to query the data dictionary for any matching block hashes.

If the query "hits" in the dictionary, i.e., if the block hash of the newly received data block matches a block hash previously stored in the dictionary, the data deduplication application may verify any query that hits in the data dictionary by determining whether the matching block hashes indicate duplicate data blocks or whether the matching block hashes represent a false positive that can occur when two data blocks that are not duplicates produce the same block hash.

Verification of a query hit may include a read and compare of the two applicable data blocks. In some cases, verification may be assumed or omitted when, as an example, the algorithm used to generate the block hashes is sufficiently "collision resistant."

If the data deduplication application verifies a query hit or otherwise concludes that a query hit corresponds to duplicate data blocks, the data deduplication application may generate and store a reference or pointer to the more senior data block in lieu of storing the newly received data block. In this manner, the amount of unique data that the data storage device contains may be increased.

SUMMARY

In at least one embodiment, disclosed subject matter provides data deduplication support using a two-tiered data dictionary that includes block hash to storage location mappings in the first tier and augmented cuckoo filters in the second tier. A disclosed IHS/data storage device includes an interface for receiving data blocks, a storage medium including nonvolatile mass storage, and a processor-executable data deduplication application that includes data deduplication operations for maintaining a data dictionary indicative of previously received data blocks. The data dictionary may includes a storage tablet indicating previously received data blocks with block hashes corresponding to the previously received data blocks and a secondary index including an augmented cuckoo filter indicating previously received data blocks using fingerprints derived from the previously received block hashes.

The data deduplication operations may further include querying the data dictionary, including querying the storage tablet for a matching block hash and, if a matching block hash is not identified in the storage tablet, determining a fingerprint for the block hash and querying the ACF for a matching fingerprint. If a matching block hash or a matching fingerprint occurs, the application may determine whether the data block is a duplicate of a previously received data block. If the data block is a duplicate data block, a reference to the previously received data block may be stored in lieu of storing the data block.

In another aspect, a disclosed IHS includes a processor and a computer readable medium including processor-executable instructions enabling the processor to perform data deduplication operations. The data deduplication operations may include operations for generating a block hash corresponding to a data block and querying a data dictionary for an indication of a previous occurrence of the block hash.

The data dictionary may include an active storage tablet that includes a plurality of records, each record including a previously received block hash and a corresponding storage location. The data dictionary may further include a secondary index including at least one ACF comprising a plurality of ACF entries, each ACF entry indicative of a previously received block hash and each ACF entry including, in lieu of the previously received block hash, a fingerprint of the previously received block hash. The ACF entry may further include a tablet index indicative of a storage tablet associated with the previously received block hash.

If the data dictionary query produces a result indicating no previous occurrence of the block hash, the data block is stored to a storage location in a storage medium. If the query result indicates a previous occurrence of the block hash, the data deduplication operations may determine whether the data block and a previous data block associated with the previous occurrence of the block hash are duplicate data blocks. If the two data blocks are duplicates, a reference to the previous data block may be stored to the storage medium at the storage location instead of storing the entire data block.

In another aspect, a data deduplication method includes generating a block hash for a newly received data block and querying a data dictionary for data indicative of a previous occurrence of the block hash. The data dictionary may include a storage tablet and a secondary index. The storage tablet may include a plurality of records, each record including a previously received block hash and a corresponding storage location. The secondary index may include at least one ACF comprising a plurality of ACF entries representing previously received data blocks. If the query produces no previous occurrence of the block hash, the data block is stored to a storage location in a storage medium. The data dictionary may be updated by storing the block hash and the storage location as a record in the active storage tablet and inserting filter construction fields derived from the block hash as a record in a filter construction array. When sufficient filter construction array entries have been stored in the filter construction array, a new ACF may be generated from the records in the filter construction array.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following FIGUREs and detailed written description.

BRIEF DESCRIPTION OF THE DRAWINGS

The description of the illustrative embodiments can be read in conjunction with the accompanying FIGUREs. It will be appreciated that, for simplicity and clarity of illustration, elements illustrated in the FIGUREs have not necessarily been drawn to scale. For example, the dimensions of some of the elements may be exaggerated relative to other elements. Embodiments incorporating teachings of the present disclosure are shown and described with respect to the FIGUREs presented herein, in which.

DETAILED DESCRIPTION

In the following detailed description, specific exemplary embodiments in which disclosed subject matter may be practiced are described in sufficient detail to enable those skilled in the art to practice the disclosed embodiments. For example, details such as specific method orders, structures, elements, and connections have been presented herein. However, it is to be understood that the specific details presented need not be utilized to practice embodiments of disclosed subject matter. It is also to be understood that other embodiments may be utilized and that logical, architectural, programmatic, mechanical, electrical and other changes may be made within the scope of the disclosed subject matter. The following detailed description is, therefore, not to be taken as limiting the scope of the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features may be described which may be exhibited by some embodiments and not by others. Similarly, various requirements may be described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

Figure 1:
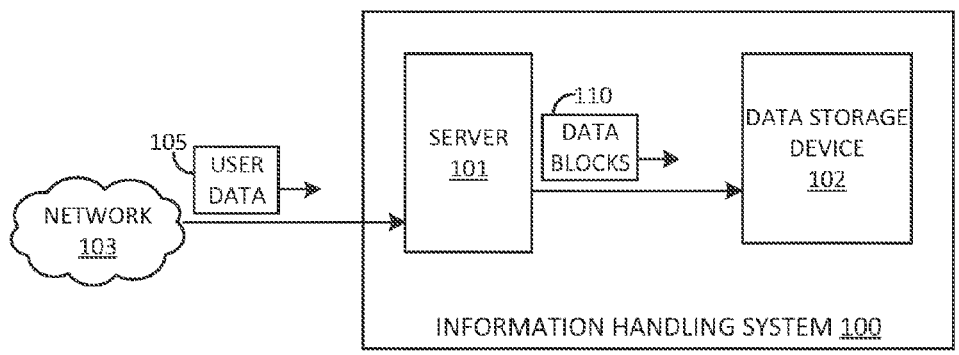
FIG. 1 illustrates an example IHS.

FIG. 1 illustrates an IHS 100 that includes a server 101 and a data storage device 102. The server 101 is coupled to a network 103 and receives user data 105 from the network. FIG. 1 further illustrates server 101 providing data blocks 110 to data storage device 102. In at least one embodiment, the data storage device 102 illustrated in FIG. 1 supports data deduplication and includes data deduplication features described herein.

The particular configuration of the IHS 100 illustrated in FIG. 1 is an example of a system in which disclosed data deduplication features may be beneficially employed, but disclosed data deduplication features may benefit any IHS that stores user data or other types of data in persistent storage.

The IHS 100 illustrated in FIG. 1 encompasses two distinct devices, server 101 and data storage device 102. Embodiments of IHS 100 may, however, incorporate or integrate the data storage resources of data storage device 102 into server 101, while still other embodiments may employ distributed or remote data storage resources that communicate with server 101 via an intervening network.

In addition, although FIG. 1 identifies element 100 as an IHS, element 101 as a server, and element 102 as a data storage device, it should be noted that both server 101 and data storage device 102 may be IHSs as well. For the sake of clarity, however, the following description will identify element 101 as the server and element 102 as the data storage device unless expressly indicated otherwise.

Generally, data deduplication refers to resources and processes that attempt to conserve storage resources by identifying duplicate data blocks and storing only one instance of any duplicate data blocks identified. If a data block 110 is unique with respect to previously received data blocks, data storage device 102 stores the data block 110 in mass persistent storage (not explicitly illustrated in FIG. 1). If, however, a newly received data block 110 is or may be a duplicate of a previously received data block, data storage device 102 may verify the suspected match and, if verified, conserve storage capacity by storing a pointer or reference to the previously received data block in lieu of storing a second instance of the entire data block.

The data dictionary used by a data deduplication application is generally implemented in random access memory (RAM). The more RAM that is devoted to the dictionary, the more hash-to-location mappings that can be stored within it. However, because RAM is comparatively expensive, data deduplication features disclosed herein beneficially achieve a desirably high mapping density, i.e., a desirably high number of mappings/byte. Higher mapping densities are beneficial because they enable greater deduplication capability for a given RAM footprint or, alternatively, enable equivalent deduplication capability in a smaller RAM footprint.

The hashing of data blocks employed by data deduplication applications may be achieved with a variety of different hashing algorithms having a range of collision resistances. A data deduplication application that requires a collision resistant hashing algorithm will consume more of the available processing capacity than a data deduplication application that does not. Disclosed data deduplication systems and methods are agnostic with respect to the collision resistance of the hashing algorithm or hashing algorithms employed. By supporting data deduplication with less robust hashing algorithms, disclosed data deduplication systems and methods reduce the amount of processing capacity required, allowing more processing capacity for other tasks and thereby improving system performance.

Data blocks written to a data storage device can be categorized as unique or duplicate. For unique data blocks, the write performance of IHSs that employ data deduplication is highly dependent on how quickly the data deduplication application can recognize the uniqueness of the data block. Since the block hash of a unique data block will not be present in the data dictionary, write performance for unique data blocks is a function of how quickly the data dictionary can produce a query miss when queried with the block hash of a unique data block. Disclosed data deduplication systems and methods support extremely fast detection of data block uniqueness with a RAM-resident high density data dictionary.

For non-unique, i.e., duplicate data blocks, the write performance and final deduplication ratio of IHSs employing data deduplication are a strong function of the system's ability to locate patterns within distinct write streams. Disclosed data deduplication systems and methods beneficially transition temporally co-located mappings from slow and distant storage metadata into RAM for faster lookup when a pattern is detected. This feature of disclosed data deduplication systems and methods increases the likelihood of further pattern matching which increases deduplication ratio. A higher deduplication ratio represents a higher effective write throughput attributable to processing cycles conserved by not storing duplicate blocks.

A data storage system needs to be fault tolerant. Fault tolerance can be improved by reducing the amount of metadata needed to read and write data. Disclosed data deduplication systems and methods exhibit fault tolerance by functioning as a semi-trusted advisor, requiring that responses to all dictionary queries be verified by the external system. Accordingly, metadata associated with the data dictionary becomes optional and any corruption or destruction of the storage metadata will not detrimentally impact to read and write correctness.

Figure 2:
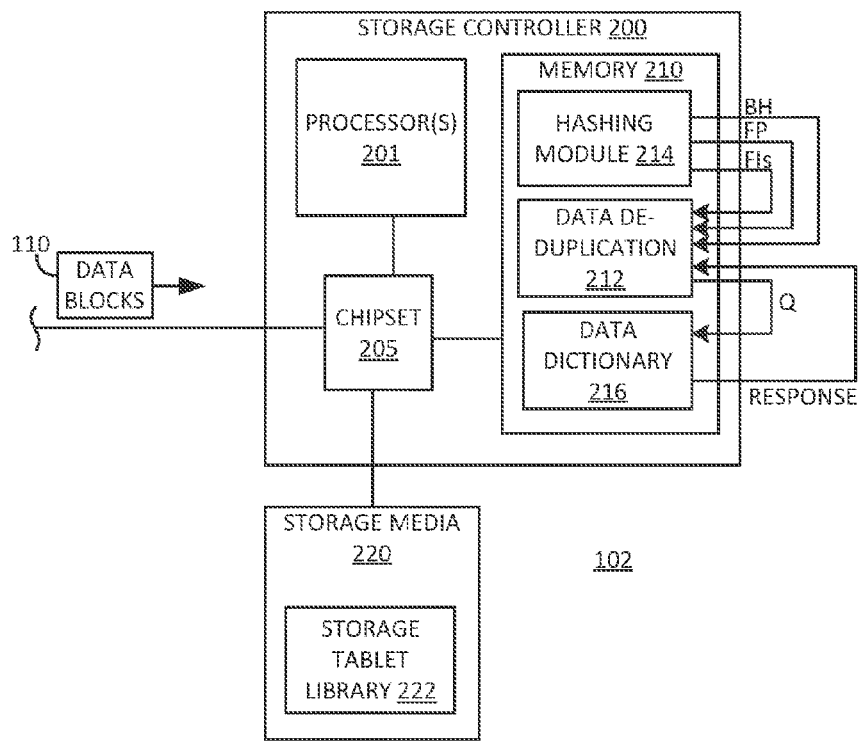
FIG. 2 illustrates a block diagram of a data storage device.

FIG. 2 illustrates a block diagram of a data storage device 102 including data deduplication features in accordance with disclosed subject matter. The data storage device 102 illustrated in FIG. 2 includes a storage controller 200 and one or more processors 201 coupled, through an intervening chip set 205, to a memory 210 and to a storage media 220. As used herein, unless expressly indicated otherwise, the term "storage" refers to mass persistent storage including, as examples, hard disk storage, solid-state storage, or a combination thereof including redundant array of independent drives (RAID)-configured storage, while the term "memory" refers to volatile, random access memory (RAM) devices including, as examples, dynamic RAM (DRAM) and static RAM (SRAM) devices.

Storage media 220 and memory 210 may both store data, processor-executable instructions, or a combination of both. The memory 210 illustrated in FIG. 2 includes processor-executable data deduplication application 212, sometimes referred to herein as data deduplication application 212, which may access one or more hashing algorithms, represented in FIG. 2 by hashing module 214. Memory 210 may further include a data dictionary 216 stored in memory 210, and a storage tablet library 222 stored in storage media 220, all as described in more detail with respect to FIG. 3 and following.

FIG. 2 illustrates data storage device 102 with data deduplication application 212 stored in memory 210. However, those of ordinary skill in the field of IHSs will appreciate that system memory 210 may be erased or cleared from time to time including, as an example, following a power cycle. Accordingly, data deduplication application 212 may reside in storage media 220 or another persistent storage medium (not depicted in FIG. 2) and may have to be loaded into memory 210 by processor(s) 201 and/or chipset 205 before the instructions may be executed by processor(s) 201.

Generally, data duplication application 212 maintains a data dictionary 216 that includes information indicative of previously received data blocks. When a new data block is received, data duplication application 212 queries (Q) data dictionary 216 to obtain either a conclusive indication that the new data block is unique or an inconclusive indication that the data block may be a duplicate. Unique data blocks are stored to memory in their entirety. Data blocks that are confirmed as duplicates may be deduplicated by storing a reference or pointer to the matching data block rather than storing the duplicate block in its entirety. Data dictionary 216 may include one or more disclosed features to reduce the amount of memory required and to improve performance.

Data deduplication application 212 may include or invoke a hashing module 214 supporting one or more hashing algorithms to generate compressed representations of data blocks and other data elements and to implement query filters that greatly reduce the number of elements in an array that a query must check to determine whether the array contains a match.

In at least one embodiment, hashing module 214 includes support for a first hashing algorithm referred to herein as the block hashing algorithm (BHASH) that hashes a data block to obtain a first hash value, referred to herein as the block hash (BH). Hashing module 214 may include a second hashing algorithm, referred to herein as the fingerprint hashing algorithm (FHASH) configured to hash the block hash BH to obtain a second hash value referred to herein as the block hash fingerprint or, more simply, the fingerprint (FP). Hashing module 214 may further include a third hashing algorithm, referred to herein as the index hash (IHASH), that generates two or more hash values, referred to herein as filter indices (FIs), based on the block hash BH and the fingerprint FP. As part of maintaining the data dictionary 216, data deduplication application 212 may incorporate the block hash BH and the fingerprint FP of new data blocks into data dictionary 216 to keep data dictionary 216 current.

The particular algorithm or algorithms used by hashing module 214 is an implementation detail. One or more of the hashing algorithms BHASH, FHASH, and IHASH may be a collision-resistant, cryptographic hashing algorithm, e.g., SHA-256 while some of the hashing algorithms may be faster, collision permissive hashing algorithms such as MurmurHash.

Figure 3:
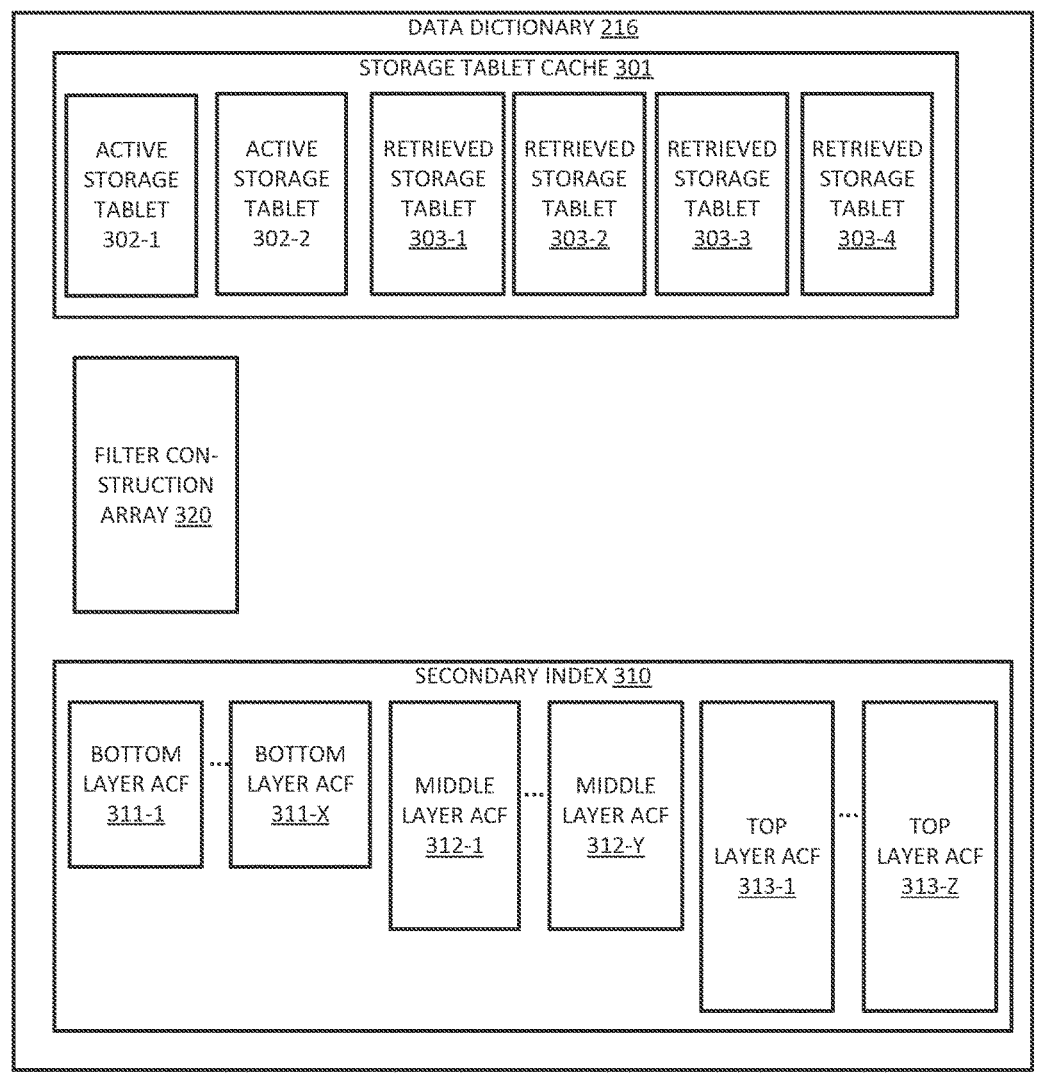
FIG. 3 illustrates a block diagram of a data dictionary.

FIG. 3 illustrates selected elements of an example data dictionary 216. The data dictionary 216 illustrated in FIG. 3 includes a storage tablet cache 301 that includes one or more storage tablets. Disclosed storage tablets include storage tablet records that map the block hash of a data block to a storage location of the data block. The storage tablet cache 301 illustrated in FIG. 3 includes one or more active storage tablet(s) 302 and zero or more retrieved storage tablets 303. An active storage tablet 302 represents refers to a storage tablet into which hash-to-location mappings for newly ingested data block are being stored. Retrieved storage tablets 303 include storage tablets paged into storage tablet cache 301 from storage tablet library 222 (FIG. 2) when a dictionary query hits in the secondary index.

The storage tablet cache 301 illustrated in FIG. 3 includes active storage tablets 302-1 and 302-2 and retrieved storage tablets 303-1, 303-2, 303-3, and 303-4. Storage tablet cache 301 may, however, include more or fewer active storage tablets 302, more or fewer retrieved storage tablets 303, or both. In addition, whereas the storage tablet cache 301 illustrated in FIG. 3 includes more retrieved storage tablets 303 than active storage tablets 302, storage tablet cache 301 may include the same number of active storage tablets 302 and retrieved storage tablets 303 or may contain fewer retrieved storage tablets 303 than active storage tablets 302.

As illustrated in FIG. 3, storage tablet cache 301 may include two or more active storage tablets 302. In at least one embodiment, the use of multiple active storage tablets may enable or support beneficial performance improvements. As an example, if write stream information were provided to the data storage device along with each data block, the write stream information could be used to associate block hashes from the same write streams to the same storage tablet. Stream-specific storage tablets may increase co-location of pattern data potentially resulting in an increased deduplication ratio.

The data dictionary 216 of FIG. 3 includes, in addition to the storage tablet cache 301, a secondary index 310 that includes one or more probabilistic set membership data structures referred to herein as augmented cuckoo filters (ACFs) 311, 312, and 313. The term "cuckoo filter" is a reference to the cuckoo filters described in: B. Fan, D. G. Andersen, M. Kaminskyy, & M. D. Mitzenmacher, *Cuckoo Filter: Practically Better Than Bloom* CoNEXT '14 Proceedings of the 10th ACM Int'l Conference on Emerging Networking Experiments and Technologies, pp. 75-88 (ACM Dec. 2, 2014) (Hereinafter FAN), which is incorporated by reference herein, in its entirety. In FAN, each cuckoo filter entry has, as its sole field, a block hash fingerprint or, more simply, fingerprint, and in which a cuckoo filter query produces a binary result.

The ACFs disclosed herein may include, in addition to a fingerprint field, one or more additional fields in each ACF entry. Disclosed ACF fields include, in addition to a fingerprint field, a tablet index (TI) field. Moreover, a dictionary query that hits in secondary index 310 may produce the tablet index of the matching ACF entry as the query result. The tablet index may identify one of a plurality of storage tablets in storage tablet library 222 and the identified storage tablet may be loaded into storage tablet cache 301.

Querying secondary index 310 may include querying the storage tablets in storage tablet cache 301 first and then querying the ACFs in secondary index 310. Multiple storage tablets and multiple ACFs may be queried serially or in parallel if the system supports multi-processing/vector instructions. If a dictionary query hits in two or more ACFs, the hit corresponding to the most recently generated ACF may be selected and the hit(s) corresponding to older ACFs may be ignored or discarded.

The secondary index 310 illustrated in FIG. 3 includes three filter layers, a bottom layer (BL), middle layer (ML), and a top layer (TL). Secondary index 310 may, however, include more or fewer layers. Each filter layer in secondary index 310 may contain zero or more ACFs. The specific number of ACFs in secondary index 310 may vary with time, but the secondary index 310 of FIG. 3 may include, at any given moment, zero or more bottom layer ACFs 311, zero or more middle layer ACFs 312, and zero or more top layer ACFs 313.

The bottom, middle, and top filter layers of secondary index 310 may be associated with characteristics of the corresponding ACFs. As one example, the entries in bottom layer ACFs 311 may be derived from more recently received data blocks while entries in top layer ACFs 313 may be derived from less recently received data blocks. As another example, bottom layer filters 311 may have the least number of entries while top layer filters 313 may have the largest number of entries. As yet another example, the structure of the query input provided to the ACFs in each filter layer may vary. The query input provided to the bottom layer ACFs 311 may have fewer bits than the query input provided to the top layer ACFs 313. In all of the preceding examples, the middle layer ACFs 312 may have intermediate filter layer characteristics, e.g., more entries than bottom layer ACFs 311 and less entries than top layer ACFs 313.

As described with respect to FIG. 6 and FIG. 7 below, the secondary index 310 of FIG. 3 may be configured wherein bottom layer ACFs 311 represent N1 previously received data blocks, middle layer ACFs 312 represent N2 bottom layer ACFs, i.e., N2*N1 data blocks, and top layer ACFs 313 represent N3 middle layer ACFs, i.e., N3*N2*N1 data blocks, where N1, N2, and N3 are positive integers and N1>N2>N3. In at least some of these embodiments, secondary index 310 may include, at any given moment in time, zero to N2−1 bottom layer ACFs 311, zero to N3−1 middle layer ACFs 312, and zero to N4 top layer ACFs 313, where N4 is a positive integer.

As new data blocks 110 are received by data storage device 102, block hashes (BH) and fingerprints (FP) may be generated by data deduplication application 212. Data deduplication application 212 may store the block hashes and their corresponding storage locations as records in an active storage tablet 302. When an active storage tablet 302 has been filled to capacity, it may be archived by being stored to storage tablet library 222 in data storage 220 and a new active storage tablet 302 may be initialized.

If storage tablet library 222 is, itself, filled to capacity, the active storage table being archived may overwrite or otherwise displace one of the existing storage tablets in storage tablet library 222. For example, storage tablets may be time stamped when they are created. When a storage tablet in storage tablet library 222 must be displaced to make room for a more recently generated tablet, the timestamps may be consulted to identify the oldest storage tablet as the storage tablet to be displaced.

The data dictionary 216 illustrated in FIG. 3 includes a data structure, referred to herein as the filter construction array (FCA) 320, configured to facilitate the periodic or non-periodic generation of ACFs 311, 312, and 313. For each block hash received, data deduplication application 212 may generate an FCA record comprising a particular set of FCA fields or attributes, and store the FCA record in FCA 320. When FCA 320 contains sufficient FCA records, a new ACF is generated. This process is described in more detail with respect to FIG. 6 and FIG. 7.

Figure 4:
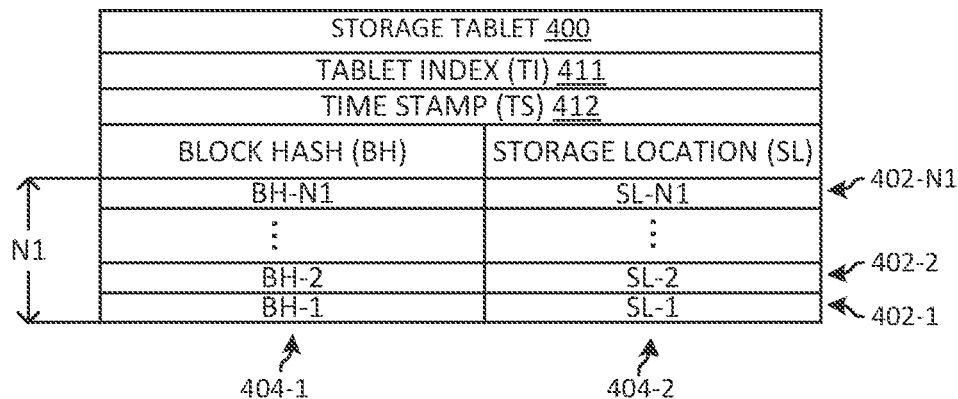
FIG. 4 illustrates an active storage tablet.

FIG. 4 illustrates an example storage tablet 400, which may reflect the structure of an active storage tablet 302, a retrieved storage tables 303, or both. In at least one embodiment, example storage tablet 400 is a fixed-sized data structure that originates as an active storage tablet 302 in storage tablet cache 301. As new data blocks arrive, the block hashes and the corresponding storage locations may be stored into the storage tablet until the tablet is filled to capacity, at which point the active storage tablet 302 may be stored as an archived storage table 303 in storage tablet library 222 (FIG. 2).

The example storage tablet 400 of FIG. 4 includes a time stamp 412, a tablet index 411, and N1 storage tablet records 402, each of which includes a set of storage tablet fields 404. The active storage tablet records 402 illustrated in FIG. 4 include two storage tablet fields, a block hash field 404-1 containing the block hash (BH) of the applicable data block and a storage location field 404-2 containing the storage location (SL) of the applicable data block. As illustrated in FIG. 4, each storage tablet record 402 represents a BH-to-SL mapping of a corresponding data block. Other embodiments may employ additional fields 404 in each storage tablet record 402.

Some embodiments may filter the set of all block hashes to obtain a subset of the block hashes, referred to as a "key hash" that may be used as the input key to the ACFs. For example, the set of key hashes may include all of the block hashes in which a particular set of bits match a particular pattern. Thus, the set of key hashes may include, as three non-limiting examples, (1) all block hashes in which the five most significant bits are 00000b, (2) all block hashes having six least significant bits are 000000b, and (3) all block hashes in which bits 6 through 10 inclusive are 10101b.

Figure 5:
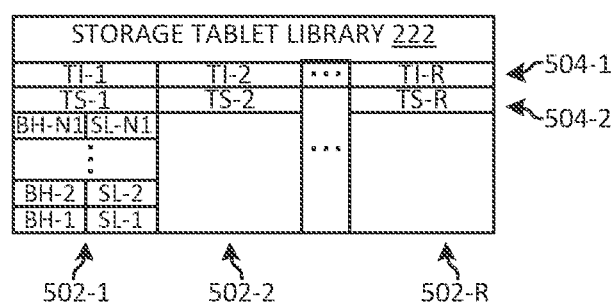
FIG. 5 illustrates an example storage tablet library.

FIG. 5 illustrates a storage tablet library 222 exemplary of the storage tablet library 222 illustrated in FIG. 2. Storage tablet library 222 may function as a repository or archive of previously generated active storage tablets 302 (FIG. 4). The illustrated storage tablet library 222 may be a fixed-size data structure that has capacity for as many as R records, where each record 502 represents a storage tablet that previously existed in storage tablet cache 301. As previously illustrated in FIG. 2, storage tablet library 222 may be located in storage media 220 or another persistent storage medium. In some embodiments, once storage tablet library 222 reaches full capacity, a subsequently archived storage tablet may overwrite the oldest storage tablet library record 502 in storage tablet library 522, as conveyed by the TS field 504-2 in each storage tablet library record 502.

Accordingly, data deduplication application 212 may access storage tablet library 222 and identify the oldest storage tablet record 502 indicated by TS field 504-2. Data deduplication application 212 may retrieve the tablet index TI from the tablet index field 504-1 of the oldest storage tablet library record 502 and store its tablet index TI into the tablet index field 411 of active storage tablet 302. In this manner, the tablet index TI in tablet index field 411 of an active storage tablet 302 identifies the storage tablet location of storage tablet library 222 into which the active storage tablet 302 will be archived when full.

Figures 6, 7:
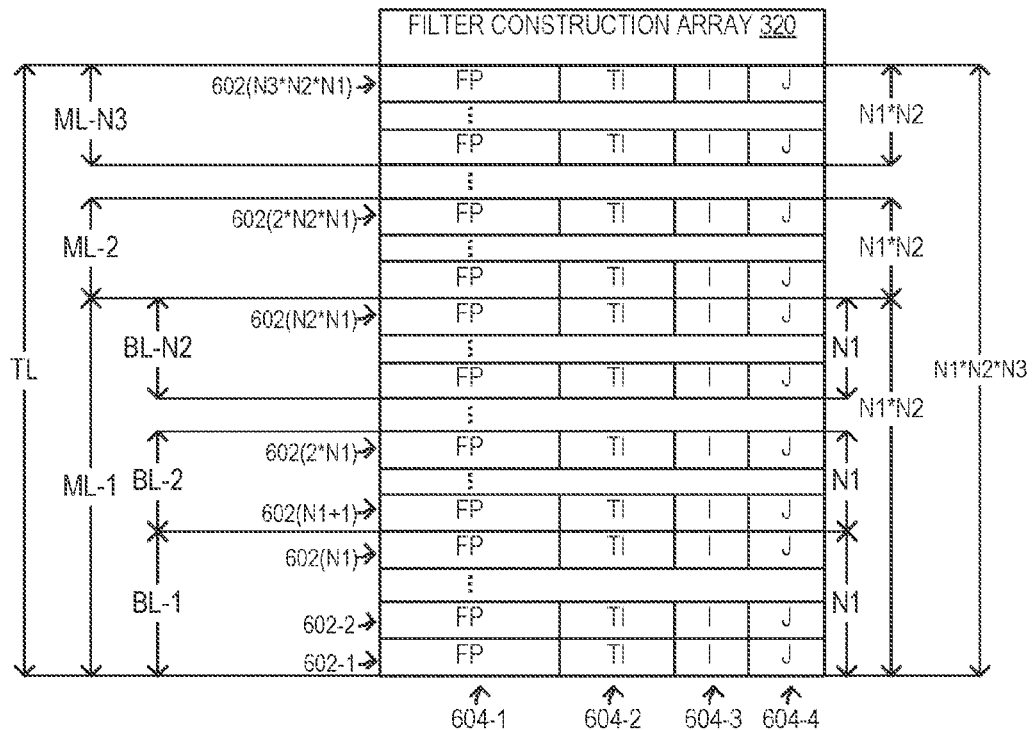
FIG. 6 illustrates an example filter construction array.
FIG. 7 illustrates an augmented cuckoo filter.

FIG. 6 illustrates an example filter construction array 320. The filter construction array (FCA) 320 illustrated in FIG. 6 is implemented as a table that includes a plurality of FCA records 602, each of which includes a set of FCA fields 604. The FCA fields 604 illustrated in FIG. 6 include a fingerprint field 604-1, a tablet index field 604-2, a first filter index (FI) field 604-3, and a second FI field 604-4.

The filter construction array 320 illustrated in FIG. 6 includes a total of N1*N2*N3 FCA records 602, which is sufficient entries to create a top level ACF 313 (see FIG. 3). Initially, all FCA records 602 are clear. Each time a new block hash is ingested into active storage tablet 302, data deduplication application 212 generates a corresponding set of filter construction array fields 604 and stores the FCA fields in the next available FCA record 602.

As FCA records 602 are added into FCA 320, data deduplication application 212 may generate new ACFs. In at least one embodiment, data deduplication application 212 generates a first bottom layer ACF (BL-1) after the first N1 block hashes have been ingested into N1 FCA records 602, a second bottom layer ACF (BL-2) is generated after 2*N1 block hashes, and so forth until N1*N2 block hashes, at which point, data deduplication application 212 has sufficient FCA records 602 to construct a first middle layer ACF (ML-1).

In at least one embodiment, when data deduplication application 212 generates a middle layer ACF 312, data deduplication application 212 deletes or clears the secondary index of all existing bottom layer ACFs 311, but leaves the corresponding records 602 in FCA 320 unchanged. As additional data blocks arrive, data deduplication application 212 continues to fill FCA 320 and begins constructing new bottom layer ACFs 311 every N1 block hashes, until N2*N1 additional block hashes have been ingested, at which point data deduplication application 212 generates a second middle layer ACF (ML-2) and again clears the existing bottom layer ACFs 311.

Data deduplication application 212 continues in this fashion such that the secondary index 310, at any given time, contains zero to N2-1 bottom layer CFs 311 and zero to N3 middle layer CFs 312. When the number of ingested block hashes reaches N3*N2*N1, all ACF records 602 in FCA 320 are occupied and the secondary index 310 contains N2-1 bottom layer CFs 311 and N3-1 middle layer CFs 312. Data deduplication application 212 then generates a top layer ACF 313, clears all bottom layer ACFs 311 and middle layer CFs 312 from the secondary index 310, and clears all records 602 in FCA 320 before starting the process over.

In some embodiments, a fixed number of top layer CFs 313 may be maintained in secondary index 310. When the number of top layer ACFs 313 equals this number, the subsequent generation of a new top layer ACF 313 may include erasing or clearing the oldest of the existing top layer ACFs 313. If secondary index 310 can contain N4 top layer filters 313, secondary index 310 has capacity to represent N4*N3*N2*N1 data blocks.

Using the 64, 32, 8, and 256 as example values for N1, N2, N3, and N4 respectively, each bottom layer ACF 311 represents a total of 64 FCA records 602 corresponding to 64 data blocks, each middle layer ACF 312 represents a total of 2048 (64*32) FCA records 602 corresponding to 2048 (2K) data blocks, each top layer ACF 313 represents a total of 16,384 FCA records and 16,384 (16K) data blocks and secondary index 310 has capacity to represent 4,194,304 (4 M) data blocks.

Referring back to FIG. 3, a single FCA 320 is illustrated. In some embodiments, when a top layer ACF 313 is being generated, data deduplication application 212 may block further FCA insertions until completion of the new top layer ACF 313. Some embodiments (not depicted) may employ two FCAs 320 such that insertions of FCA records 602 into one of the FCAs can continue while the ACF 313 is being constructed from the other FCA.

The FCA 320 illustrated in FIG. 6 includes N3*N2*N1 ACF entries 602, used to construct three layers of ACFs, wherein each ACF entry 602 has four ACF fields 604-1 through 604-4, including a fingerprint field 604-1, a tablet index field 604-2 and two filter index fields 604-3 and 604-4. It will be appreciated, however, that FCA 320 may include more or fewer entries 602, may be used to generate more or fewer ACF layers, and may include more or fewer fields 604 in each entry 602.

Data deduplication application 212, in conjunction with hashing module 214, calculates or otherwise obtains values for each FCA field 604 in an FCA record 602. For the FCA 320 of FIG. 6, data deduplication application 212 computes a fingerprint FP for each fingerprint field 604-1, a first filter index value, I, for each first filter index field 604-3, and a second filter index value, J, for each second FI field 604-4.

The computation of a fingerprint FP may include hashing a block hash BH with the fingerprint hashing algorithm FHASH or by otherwise manipulating the block hash BH. The fingerprint hashing algorithm FHASH need not be the same as or similar to the block hashing algorithm BHASH used to compute the block hash BH. Generally, the fingerprint FP has substantially fewer bits than the block hash BH.

The number of bits in the fingerprint FP is an implementation determination and various fingerprint bit widths may be used. The fingerprint bit width influences the rate at which an ACF generates false positives, with longer fingerprints exhibiting lower false positive rates. At least some embodiments employ different fingerprint bit widths for each of the filter layers as a technique for managing the tradeoff between false positive rates and increased computational costs associated with longer fingerprints.

In at least one embodiment, longer fingerprints may be employed in the top layer ACFs 313 to align the higher false positive rates of shorter fingerprints to the bottom layer ACFs 311, where the probability of a hit is inherently lower due to the fewer number of filter entries. Alternatively, longer fingerprints may be employed in the bottom layer filters 311 to confine the higher computational costs associated with achieving lower false positive rates to the smaller filters.

The value I of the first FI field 604-3 may be determined by hashing block hash BH with the IHASH algorithm. The value J of the second FI field 604-4 may be generated by performing an EXOR of the first FI value I 604-3 and a value determined by performing the IHASH algorithm on the fingerprint FP. In these embodiments, data deduplication application 212 may generate the FCA fields, other than the tablet index TI, with the following equations.

$$FP = FPHASH(BH)$$

$$I = CFIHASH(BH)$$

$$J = I\ EXOR\ CFIHASH(FP)$$

As one of ordinary skill in the field of hashing algorithms might appreciate, given the fingerprint FP, the first CFI, I, may be generated from the second CFI, J, and vice versa, without retrieving the original block hash BH. Accordingly and beneficially, block hash BH need not be stored in the ACFs.

FIG. 7 illustrates an ACF 700 generated from FCA 320 illustrated in FIG. 6. The ACF 700 illustrated in FIG. 7 includes N entries 702 where each entry 702 includes a set of ACF fields 704. Each of the ACF fields 704 illustrated in FIG. 7 includes a fingerprint field 704-1 containing a fingerprint FP and a tablet index field 704-2 containing a tablet index TI.

The generation of ACF 700 from FCA 320 proceeds in a manner described in FAN, wherein filter generation code, which may be included within data duplication application 212, retrieves an FCA record 602 from FCA 320 and checks ACF 700 for availability in either of the two ACF entries 702 corresponding to the two filter indices, I and J, stored in CFA fields 604-3 and 604-4 of each FCA entry 602 in FCA 320. If the I-th ACF entry, ACF entry 702-I, is empty, the corresponding fingerprint FP and tablet index TI are stored in ACF fields 704-1 and 704-2 respectively. If ACF entry 702-I is occupied, the filter generation code stores the fingerprint FP into the J-th ACF entry, ACF entry 702-J, regardless of whether this entry was occupied or not. If ACF entry 702-J was previously occupied, the filter generation code relocates the previous occupant of ACF entry 702-J to its alternative entry. As previously noted, an ACF entry's alternative entry can be determined using the entity's fingerprint FP and the index hashing algorithm IHASH.

This process of relocating ACF entries to their alternative entries continues until an alternative entry to which an ACF entry is moved is empty. The filter generation algorithm may include code to detect an excessive number of relocations associated with the insertion of a single ACF entry 702. If the number of ACF entry relocations triggered by the insertion of one ACF entry 702 exceeds a threshold value, the ACF may be identified as full and a new ACF may be generated. Alternatively, if the number of ACF entry relocations resulting from an attempt to insert a particular FCA record into an ACF exceeds a threshold value, the FCA record may be flagged to prevent further attempts to insert the FCA records and filter construction may then continue by attempting to incorporate any remaining un-inserted FCA records. In this embodiment, a breach of the ACF entry relocation threshold does not necessarily trigger generation of a new ACF.

FIG. 7 illustrates an exemplary case in which ACF 700 is quite densely packed with ACF entries 702 containing finger prints FP, with only a small number of ACF entries 702 remaining empty after all of the filter construction array records 602 have been processed. FIG. 7 further illustrates that some ACF entries 702 occupy the entry indicated in their first FI field 604-3 (FIG. 6) while others occupy the entry indicated in their second FI field 604-4 (FIG. 6). Thus, in at least one embodiment, construction of ACF 700 completes when either all of the applicable entries 602 in FCA 320 have been processed or when an attempt to process a particular FCA entry 602 results in a number of ACF entry relocations exceeding a particular threshold.

FIG. 7 also illustrates that the ACF 700 includes the tablet index TI within the tablet index field 704-2 of each ACF entry 702. The tablet index field 704-2 is or represents the output of the ACF in response to a query that matches the corresponding fingerprint FP in fingerprint field 704-1. In this configuration, a query for a particular fingerprint that hits to one of the entries in ACF 700 outputs the tablet index TI of the filter entry 702 containing the matching fingerprint FP. By outputting a tablet index rather than simply indicating a binary output, the illustrated ACF enables a more efficient verification of whether a fingerprint match corresponds to an actual duplicated data block by identifying the particular storage tablet containing the block hash and storage location of the data block that produced the query hit.

Figure 8:
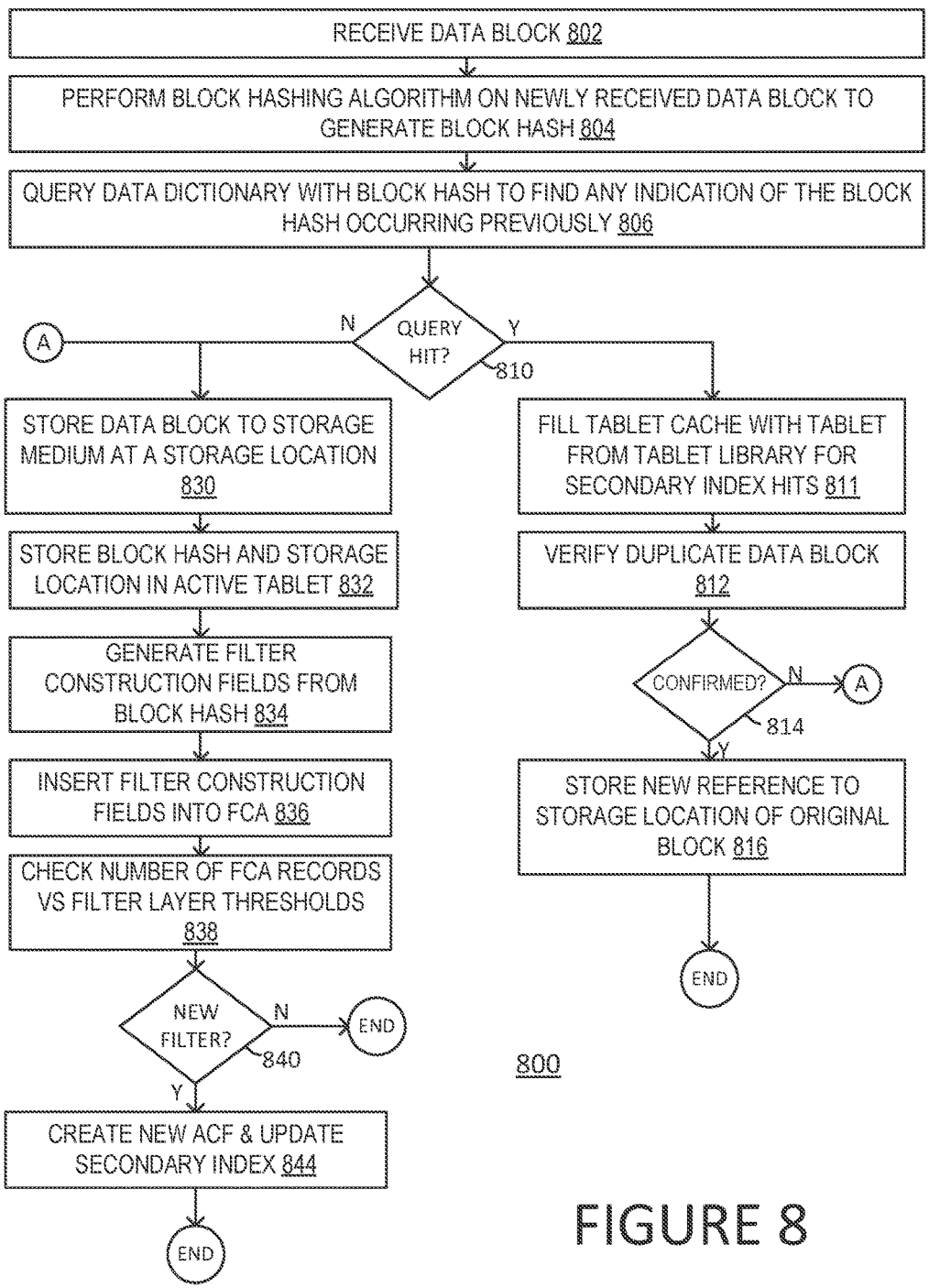
FIG. 8 illustrates a flow diagram of a data deduplication method.

FIG. 8 illustrates elements of a data deduplication method 800 in accordance with the disclosed embodiments. The method 800 illustrated in FIG. 8 includes receiving a data block operation 802. The illustrated method then performs a block hashing algorithm operation 804 on the newly received data block to generate a block hash. Data deduplication application 800 may then query (operation 806) the data dictionary using the block hash as the query input to find any indication of a previous occurrence of the block hash. As described with respect to FIG. 1 through FIG. 7, querying the data dictionary may include querying one or more storage tablets stored in storage tablet cache and querying one or more ACFs in one or more ACF layers within the secondary index.

The querying of the data dictionary in operation 806 may include querying the storage tablets using the block hash as well as querying the ACFs in the secondary index using the fingerprint corresponding to the block hash. If the data dictionary query of operation 806 hits (operation 810) in secondary index 310, the illustrated method 800 then fills (operation 811) tablet cache 301 with the applicable tablet from tablet library 222. If the query hits in an active storage tablet 302, operation 811 may be omitted because the tablet cache 301 already contains the tablet containing the block hash the produced the query hit.

The method 800 illustrated in FIG. 8 may then verify (operation 812) whether the query hit corresponds to a data block that is an actual duplicate or whether the query hit represents a false positive. The manner of verifying a duplicate data block following a query hit is an implementation detail, but may include a byte-by-byte comparison of the two applicable data blocks.

If the query hit is confirmed (operation 814), indicating that the newly received data block is a duplicate, method 800 includes storing (operation 816) a new reference to the storage location of the original data block rather than storing the newly received data block as a duplicate.

If the data dictionary query at operation 806 missed within the data dictionary, method 800 proceeds to operation 830 where the newly received data block is stored to the storage medium at a storage location. Thereafter, in operation 832, the block hash and the corresponding storage location are stored as a new record in the active storage tablet. To incorporate the block hash of the newly received data block into the secondary index, the illustrated method 800 then generates (operation 834) filter construction fields from the block hash and inserts (operation 836) the filter construction fields into the next available record of the filter construction array. Method 800 as illustrated in FIG. 8 may check (operation 838) the number of filter construction array records after inserting a new record and comparing the number of records to one or more filter layer thresholds.

As described previously with respect to FIG. 6 and FIG. 7, if the number of filter construction array records indicates that a new ACF should be generated (operation 840), then method 800 creates (operation 844) the new ACF and updates the secondary index.

The previously described figures illustrate de-deduplication in the context of a single storage controller. However, the deduplication described herein may be extended to multi-controller scenarios in which each controller maintains its own storage tablet caches, storage tablet libraries and its own data dictionary, including its storage tablet cache and second index. When a block hash is ingested, the local controller may query all remote controllers for the block hash. If the block hash hits in the data dictionaries of two or more remote controllers, the newest hash mapping, determined by referring to the timestamp information stored with each tablet, may be used.

If the most recent insertion of a particular block hash is located in the secondary index of a remote controller, the local controller may page into its storage tablet cache the tablet that holds the applicable block hash. These inter-controller queries and tablet transfers may be achieved using, as an example, inter-process communication (IPC) or by accessing the remotely located storage tablet directly on disk. As new hash matches are found from the imported storage tablet, the local controller may insert the hash mappings into its own newest tablet. In this manner, hashes may be effectively migrated between controllers based on which controller has most recently written the applicable data.

During a controller failure, ownership of its hashes may automatically migrate to other controllers. During a controller remove, the removed controller's secondary index can be distributed to the remaining controllers by dividing up its tablets and filters using a round-robin or another suitable scheme. Conversely, during a controller add, a subset of each remote controller's secondary index may be inserted into the newly added controller's secondary index.

Any one or more processes or methods described above, including processes and methods associated with the FIG. 8 flow diagrams, may be embodied as a computer readable storage medium or, more simply, a computer readable medium including processor-executable program instructions, also referred to as program code or software, that, when executed by the processor, cause the processor to perform or otherwise result in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. IHSs may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicate the presence of stated features, operations, elements, and/or components, but does not preclude the presence or addition of one or more other features, operations, elements, components, and/or groups thereof.

What is claimed is:

1. A data deduplication method, comprising:
responsive to detecting a data block, generating a block hash for the data block;
querying a data dictionary for data indicative of a previous occurrence of the block hash, the data dictionary comprising:
an active storage tablet, comprising a plurality of records, each record including a previously received block hash and a corresponding storage location; and
a secondary index including a plurality of augmented cuckoo filters (ACFs), wherein each ACF includes a plurality of ACF entries representing previously received block hashes, wherein each of the plurality of ACF entries includes:
a fingerprint derived from a corresponding block hash; and
a tablet index indicative of a particular storage tablet associated with the corresponding block hash;
wherein the plurality of ACFs includes:
a first layer ACF, representing N1 block hashes, wherein N1 is an integer greater than 1; and
a second layer ACF, each second layer ACF representing N2 previously generated first layer ACFs;
wherein querying the data dictionary includes:
generating the fingerprint for the block hash; and
querying the plurality of ACFs for a matching fingerprint; and
responsive to a result of the querying indicating no previous occurrence of the block hash:
storing the data block to a storage location in a storage medium;
storing the block hash and the storage location as a record in the active storage tablet;
inserting filter construction fields derived from the block hash as a record in a filter construction array; and
subject to sufficient entries in the filter construction array, generating a new ACF from a plurality of records in the filter construction array.

2. The method of claim 1 wherein querying the plurality of ACFs includes:
accessing a set of filter indices identifying a set of ACF entries within which the fingerprint may be located; and
comparing the fingerprint with fingerprints stored in the set of ACF entries.

3. The method of claim 2, wherein the filter construction fields include:
a fingerprint field for the fingerprint;
a tablet index field for the tablet index; and
a set of filter index fields, each of the filter index fields for one of the set of filter indices.

4. The method of claim 3, further comprising:
generating the filter construction fields, said generating including hashing the block hash according to a fingerprint hashing algorithm to generate the fingerprint.

5. The method of claim 1 wherein generating a new ACF includes:
generating a new first layer ACF every N1 filter construction array records and including the new first layer ACF in the secondary index; and
generating a new second layer ACF every N2*N1 filter construction array records and replacing existing first layer ACFs in the secondary index with the new second layer ACF.

6. The method of claim 5, wherein the secondary index includes at least one of:
a first layer ACF;
a second layer ACF; and
a third layer ACF representing N3 previously generated second layer ACFs.

7. The method of claim 6, wherein generating a new ACF includes:
generating a new third layer ACF every N3*N2*N1 filter construction array records and replacing existing second layer ACFs in the secondary index with new third layer ACF.

8. The method of claim 1, further comprising:
responsive to detecting occupied storage tablet records exceeding a particular threshold:
storing the active storage tablet to a storage tablet library; and
creating a new active storage tablet, including associating a time stamp and a tablet index with the new active storage tablet.

9. The method of claim 8, wherein the data dictionary further includes a storage tablet cache including:
one or more active storage tablets into one of which newly ingested block hashes and corresponding storage locations are inserted; and
one or more retrieved storage tablets comprising storage tablets retrieved from the storage tablet library.

10. The method of claim 9, wherein the data dictionary resides in random access memory and the storage tablet library resides in persistent storage.

11. The method of claim 9, further comprising:
associating the data block with a corresponding data stream, wherein storing the block hash in the active storage table comprises storing the block hash in a particular active storage tablet associated with the data stream.

12. The method of claim 9, further comprising:
responsive to a result of the query indicating a previous occurrence of the block hash:

determining whether the data block is a duplicate of a previous data block corresponding to the previous occurrence of the block hash; and responsive to determining that the data block is a duplicate of the previous data block, storing a reference to the previous data block, in lieu of storing the data block, at the storage location.

13. The method of claim 12, wherein the previous occurrence of the block hash corresponds to an ACF entry in the secondary index and wherein the method includes:

retrieving a storage tablet from a storage tablet library and storing the storage tablet retrieved as a retrieved storage tablet in the storage tablet cache.

14. The method of claim 1, further comprising:

querying a second data dictionary, associated with a second data storage device, with the block hash; and responsive to the query hitting in the data dictionary of the second data storage device, storing, in the active storage tablet, the block hash and the most recent storage location associated with the block hash.

15. A data deduplication method, comprising:

responsive to detecting a data block, generating a block hash for the data block;

querying a data dictionary for data indicative of a previous occurrence of the block hash, the data dictionary comprising:

an active storage tablet, comprising a plurality of records, each record including a previously received block hash and a corresponding storage location; and a secondary index including a plurality of augmented cuckoo filters (ACFs), wherein each of the plurality of ACFs includes a plurality of ACF entries representing previously received block hashes, wherein each of the plurality of ACF entries includes:

a fingerprint derived from a corresponding block hash; and a tablet index indicative of a particular storage tablet associated with the corresponding block hash;

wherein querying the data dictionary includes:

generating the fingerprint for the block hash; and querying the plurality of ACFs for a matching fingerprint, wherein querying the ACF includes:

determining a set of filter indices identifying a corresponding set of ACF entries within which the fingerprint may be located; and comparing the fingerprint with a fingerprint stored in each of the set of ACF entries;

responsive to a result of the querying of the data dictionary indicating no previous occurrence of the block hash:

storing the data block to a storage location in a storage medium;

storing the block hash and the storage location as a record in the active storage tablet;

inserting filter construction fields derived from the block hash as a record in a filter construction array wherein the filter construction fields include:

a fingerprint field for the fingerprint;

a tablet index field for the tablet index; and a set of filter index fields, each of the filter index fields for one of the set of filter indices, wherein the set of filter indices includes a first filter index and a second filter index and wherein generating the filter construction fields includes:

hashing the block hash with an index hashing algorithm to generate the first filter index;

hashing the fingerprint with the index hashing algorithm to obtain a mask; and performing an EXOR of the first ACF index and the mask to generate the second filter index; and subject to sufficient entries in the filter construction array, generating a new ACF from a plurality of records in the filter construction array.

16. An information handling system, comprising:

a processor;

a computer readable medium including processor-executable instructions enabling the processor to perform data deduplication operations comprising:

providing a new block hash, corresponding to a new incoming data block, to a data dictionary, wherein the data dictionary includes:

a secondary index including at least one cuckoo filter comprising a plurality of cuckoo filter entries, wherein each cuckoo filter entry is associated with a corresponding previously provided block hash and wherein each cuckoo filter entry includes a fingerprint derived from the corresponding previously provided block hash; and a filter construction array including a plurality of filter construction records, wherein each filter construction record is associated with a corresponding previously provided block hash and wherein each filter construction record includes:

a fingerprint derived from the corresponding previously provided block hash;

a first index indicative of a first of two possible filter entries containing the fingerprint; and a second index indicative of a second of two possible filter entries containing the fingerprint;

determining a new fingerprint, a new first index, and a new second index for the new block hash;

querying the data dictionary for an indication of a previously provided block hash matching the new block hash, wherein querying the data dictionary includes:

querying each of the at least one cuckoo filters for an entry containing the new fingerprint, wherein querying a cuckoo filter includes determining whether either of the two possible filter entries contains the new fingerprint;

responsive to determining that neither of the two possible filter entry candidates in any of the at least one cuckoo filters contains the new fingerprint:

storing the new incoming data block to a storage location in a storage medium;

inserting the new fingerprint into one of the at least one cuckoo filters; and storing the new fingerprint, the new first index, and the new second index into one of the filter construction records; and responsive to determining that a filter entry in one of the at least one cuckoo filters contains matching fingerprint, comprising a fingerprint that matches the new fingerprint:

determining whether the new incoming data block is an actual duplicate of an earlier data block corresponding to the matching fingerprint; and responsive to determining that the new incoming data block is an actual duplicate of the earlier data block, storing a reference to the earlier data block, rather than storing the new incoming data block in the storage medium.

17. The information handling system of claim 16, wherein:

the data dictionary includes one or more storage tablets, each storage tablet comprising a plurality of tablet records, each tablet record including a previously provided block hash and a corresponding storage location; and each filter construction record and each cuckoo filter entry includes a tablet index indicative of a storage tablet associated with the corresponding previously provided block hash; and wherein querying the data dictionary further includes querying the tablet records of each of the one or more storage tablets for a tablet record containing a matching block hash.

18. A data storage device, comprising:

an interface for receiving data blocks;

a storage medium including nonvolatile mass storage;

a processor-executable data deduplication application comprising data deduplication operations for:

responsive to detecting a data block of the received data blocks, generating a block hash for the data block;

querying a data dictionary for data indicative of a previous occurrence of the block hash, the data dictionary comprising:

an active storage tablet, comprising a plurality of records, each record including a previously received block hash and a corresponding storage location; and a secondary index including a plurality of augmented cuckoo filters (ACFs), wherein each ACF includes a plurality of ACF entries representing previously received block hashes, wherein each of the plurality of ACF entries includes:

a fingerprint derived from a corresponding block hash; and a tablet index indicative of a particular storage tablet associated with the corresponding block hash;

wherein the plurality of ACFs includes:

a first layer ACF, representing $N_1$ block hashes, wherein $N_1$ is an integer greater than 1; and a second layer ACF, each second layer ACF representing $N_2$ previously generated first layer ACFs;

wherein querying the data dictionary includes:

generating the fingerprint for the block hash; and querying the plurality of ACFs for a matching fingerprint; and responsive to a result of the querying indicating no previous occurrence of the block hash:

storing the data block to a storage location in the storage medium;

storing the block hash and the storage location as a record in the active storage tablet;

inserting filter construction fields derived from the block hash as a record in a filter construction array; and subject to sufficient entries in the filter construction array, generating a new ACF from a plurality of records in the filter construction array.

* * * * *